Aug. 23, 1960     I. E. LINKROUM     2,950,419

IGNITION APPARATUS

Filed Dec. 7, 1956

INVENTOR.
IRVING E. LINKROUM

BY Bauer and Seymour

ATTORNEYS

United States Patent Office 2,950,419
Patented Aug. 23, 1960

2,950,419

IGNITION APPARATUS

Irving E. Linkroum, Hancock, N.Y., assignor to The Bendix Corporation, a corporation of Delaware Filed Dec. 7, 1956, Ser. No. 627,042

14 Claims. (Cl. 315—177)

This invention relates to electrical apparatus and more particularly to electrical systems adopted for producing electrical impulses as for ignition purposes.

One of the objects of the present invention is to provide novel means for controlling the discharge of an electrical condenser, said means being of extremely simple construction.

Another object of the invention is to provide electrical apparatus including a novel circuit having a storage condenser and a spark discharge device fed thereby.

A further object is to provide a novel electric circuit of the above type which is dependable in operation and adapted for use during long periods without danger of operating failures.

Still another object is to provide novel electrical apparatus for producing sparks or arcs, such as for igniting combustible charges in combustion engines of all types.

A still further object is to provide an electrical circuit having a control gap interposed between a storage condenser and an electrical loading device, said circuit incorporating novel means for minimizing changes in resistance of the control gap over long periods of use.

Another object is to provide electrical apparatus of the condenser discharge type which embodies novel means for producing a series of high energy impulses from a condenser charged step-by-step.

Another object is to provide a novel ignition circuit which embodies a small number of parts, requires only a small space for installation, and is reliable and efficient in operation.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

Figure 1:
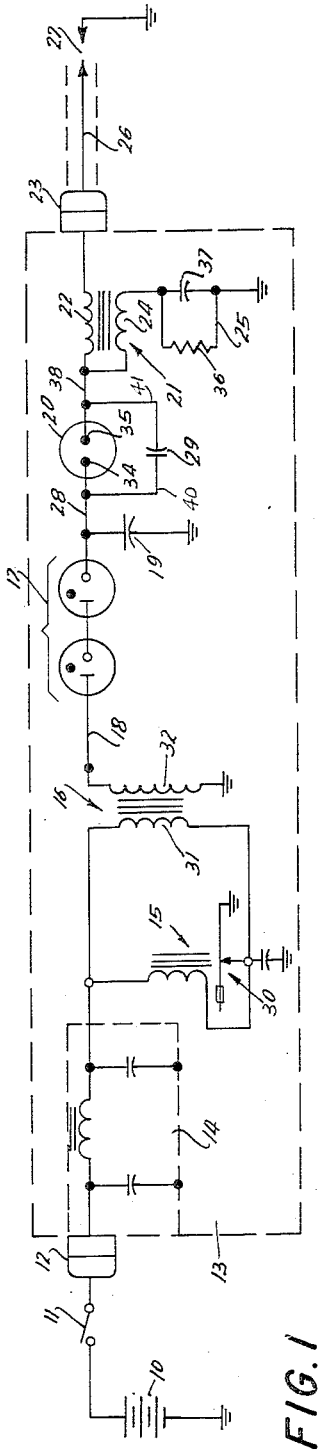
Figure 2:
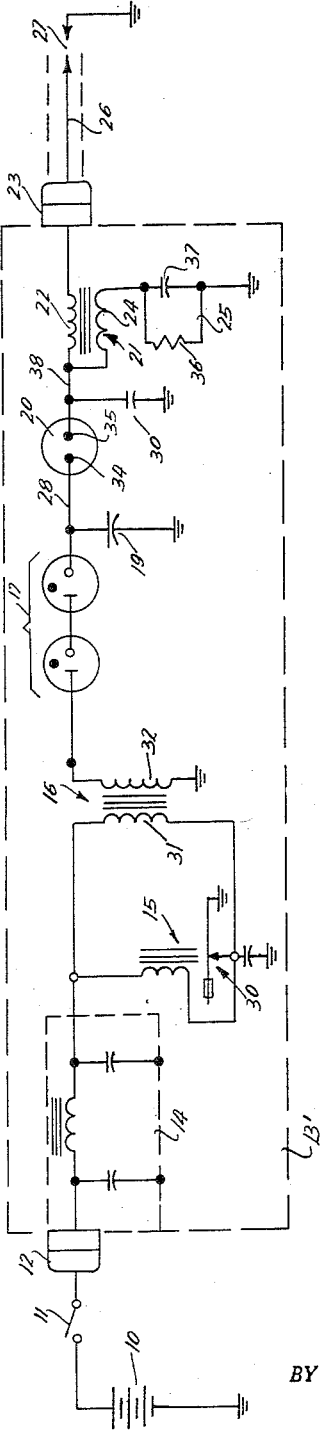

In the drawings, wherein like characters refer to like parts throughout the several views, Fig. 1 is a diagram illustrating one form of electrical circuit embodying the invention; and Fig. 2 is a diagram of another form of electrical circuit embodying the invention.

The two embodiments of the invention illustrated in the accompanying drawings are, by way of example, shown in the form of apparatus or circuits adapted for use as ignition systems in combustion engines and so-called jet and gas turbine engines.

As shown in Fig. 1, one suitable embodiment of the invention comprises, as a source of electrical energy, a battery 10 which may be connected to the remainder of the circuit by means of a switch 11 and a ground or equivalent connection as shown. It will be understood, however, that other known types of sources of electrical energy may be used, either simultaneously with or alternatively in lieu of the battery. The battery 10 may be of the storage battery type having a 24-volt rating and capable of delivering as much as about 30-volts when connected to a suitable charging means, such as a charging generator.

The battery 10 is connected by means such as a plug 12 to the input of the electrical impulse generating device of the invention, which is conveniently supplied as a unit designated 13. Such unit includes a suitable filtering means 14, useful for example where the source of energy supplies other circuits, so as to prevent radio frequencies from feeding back from unit 13 into other circuits powered by the battery 10 or other common source. In the particular embodiment shown, the filter means comprises bypass condensers connected between the shielded case of unit 13 and the power supply line, there being an inductance interposed in such power supply line and the by-pass condensers.

The battery voltage may be stepped up to a desired higher voltage by any suitable means, such as a vibrator 15, which may be connected to the battery in any suitably known manner to effect an interrupted current flow. In the illustrative embodiment, the voltage step-up means includes a transformer 16 having a primary winding in circuit with the contacts 30 of the vibrator 15. When the circuit through the contacts of the vibrator is closed, electrical current flows through the primary winding 31 of transformer 16 and when the contacts of the vibrator are opened, the primary circuit of the transformer is broken. As a result of the resulting build-up and collapsing of the magnetic field created by the primary of the transformer 16, a high voltage alternating current is induced in the secondary 32 of the transformer.

Such high voltage alternating current is led from the secondary of the transformer through rectifiers 17 to the input electrode 34 of a control spark gap 20, which is preferably of the sealed type. A storage condenser 19 is connected between wire 28 leading to said electrode 34 of gap 20 and ground or similar connection, as shown. The rectifier means 17, which may be of the gaseous tube type or of any other suitably known type such as selenium rectifiers, repeatedly passes energy of a selected polarity to storage condenser 19 and blocks the return flow of such energy from the condenser to the transformer 16. The condenser will thus be charged step-by-step or in successive increments to a voltage determined by the design of the transformer 16 and the voltage of the source of electrical energy. The rectifier means may be dispensed with if the source of electrical energy is of such a nature as to be capable of charging condenser 19 to a desired high voltage by a single impulse or otherwise in such a manner that the condenser is not permitted to discharge back through the charging circuit.

The other, discharge, electrode 35 of the control gap 20 is connected through wire 38 to one end of the primary 24 of a high frequency transformer 21. The other end of such primary is connected to ground through a circuit 25 including a resistor 36 and a condenser 37 connected in shunt. In the embodiment shown the secondary 22 of transformer 21 has one end thereof connected to the input of primary 24, the other end thereof leading to an output terminal device 23 on unit 13. From terminal 23 is shielded lead 26 extends to one electrode of the spark gap or discharge means 27, the other electrode of means 27 being connected to ground.

The device thus far described functions as follows: Control gap 20 is designed to have a relatively predetermined or constant break-down voltage. For this reason such gap as above mentioned is preferably of the sealed type so that its breakdown voltage remains at least generally constant and independent of surrounding pressures and other atmospheric pressures at different altitudes. When the charge on storage condenser 19 has built up sufficiently to ionize the gas between electrodes 34 and 35, control gap 20 discharges thereby producing a rush of current through primary 24 of transformer 21 and inducing a high voltage in secondary 22 of such transformer. Condenser 19, control gap 20, transformer 21 and discharge device 27 are so related that the voltage thus induced in the secondary 22 of transformer 21 produces a discharge of the desired character across the electrodes of device 27.

It will be apparent from the above that the discharge characteristics of control gap 20 have a vital effect upon the character of the discharge at device 27. Ideally, control gap 20 is of such character that it presents a low resistance path at the start of each of the cyclic discharges of condenser 19 therethrough. If such condition is true, resistance heating of the control gap 20 is minimized, and the high initial rush of current thus produced through the primary 24 of transformer 21 results in optimum voltage conditions in the secondary of said transformer.

With prior devices of the type described difficulty has been experienced in maintaining the breakdown voltage of the control gap 20 at a satisfactorily uniform value over long periods of use, in general, the breakdown voltage of the gap usually generally decreasing over a long period. It has been found that such decrease in breakdown voltage of control gap 20 is caused by depletion of the gas sealed within the envelope of the gap by reaction with the metal of the gap electrodes. When the gas sealed within the envelope is air, the oxygen in the air tends to react with the electrodes to oxidize them, thereupon reducing the number of gas molecules and density of the gas which may be ionized, so that gap breakdown voltage further decreases. The above described difficulty in change of breakdown voltage of control gap 20 are particularly apparent when the gap feeds into an electrical loading device having an appreciable impedance, such as the transformer 21 employed to energize discharge device 27.

The above described difficulties with change in resistance of control gap 20 are markedly reduced with the device of the present invention, so that the resistance of the gap remains much more nearly constant over long periods.

In accordance with the first embodiment of the invention, shown in Fig. 1, there is employed a second condenser, designated 29, connected across the electrodes of control gap 20. Preferably the capacity of condenser 29 is relatively small compared to that of condenser 19, a typical condenser 19 having a capacity of one mfd., and a typical condenser 29 having a capacity of .05 mfd. It will be seen that, since one side of condenser 29 is connected to wire 28, as is one side of condenser 19, and the other side of condenser 29 is connected to ground through wire 38, the primary 24 of transformer 21 and the resistor of circuit 25, a charge builds up in condenser 29 at the same time as a charge builds up in condenser 19. When the charge on condenser 19 has been built up high enough for a discharge to start between the electrodes of control gap 20, the gap is rendered conductive so that condenser 29 discharges at the same time as condenser 19. Due to the fact that both condensers 19 and 29 start discharging at the same time, the initial current rush through control gap 20 is increased considerably by the condenser 29, which discharges through gap 20 over a circuit, composed of leads 40 and 41, which has, or contains, practically no impedance. Accordingly, a much larger initial rush of current takes place through gap 20 than if condenser 29 were omitted. It is a characteristic of a gap such as that shown at 20 that the greater the current passing through the gap, the less is its resistance. Accordingly, the use of condenser 29 provides a much higher initial flow of current through the gap and a correspondingly decreased resistance of the gap. As a result, heating of the gap 20 is markedly reduced, its breakdown voltage remains nearly constant over long periods, and because of such high initial rush of current, less energy is dissipated in control gap 20 and therefore more energy is available at the discharge device 27.

In Fig. 2 there is shown a second embodiment of apparatus in accordance with the invention, such apparatus likewise functioning to decrease the resistance of the control gap 20, and to maintain its resistance substantially constant over long periods of use. The device of Fig. 2 is generally similar to that of Fig. 1, and similar parts are designated by the same reference characters. The only differences between unit 13 of Fig. 1 and unit 13' of Fig. 2 lie in the fact that in the device of Fig. 2, the condenser 29 is omitted and there is employed in its place a condenser 30 which has one side thereof connected to the lead wire 38 between the output electrode 35 of gap 20 and primary 24 of transformer 21, the other side of condenser 30 being connected to ground.

The device of Fig. 2 functions to reduce the resistance of control gap 20 at the start of a cycle of discharge of condenser 19 therethrough by providing, in effect, an easy path of flow of current from the discharge electrode of gap 20 so that the transformer 21, which functions as a choke coil, does not completely determine the rate of flow of current away from the discharge electrode of the gap. Thus, assuming that condenser 30 is initially discharged, when the voltage of the charge on condenser 19 has risen sufficiently to ionize the gas at the gap 20, condenser 19 begins to discharge through the gap. Such initially discharged current readily flows into condenser 30, so that the initial rate of current flow through gap 20 is high. Simultaneously with the charging of condenser 30 the current flows through the primary of transformer 21 thereby causing device 27 to discharge. At the end of the cycle, both of condensers 19 and 30 will be fully discharged, ready for the next cycle of the device. Condenser 19, may, for example, have a capacity of 1 mfd., and condenser 30 may have much smaller capacity, for example .05 mfd.

Although only a limited number of embodiments and modifications of the invention have been illustrated in the accompanying drawings and described in the foregoing specification, it is to be expressly understood that the invention is not so limited, but may be embodied in other specifically defined circuits. For example, other well-known sources of interrupted, pulsating, direct or alternating current may be provided in lieu of the battery-vibrator combination illustrated, such as D.C. or A.C. generator, and other suitable types of rectifiers known to the art may be utilized in lieu of the type illustrated and specifically mentioned. For example, two or more devices consisting of a vibrator-transformer combination, rectifier, control gap, etc., may be fed from the output line of one filter device 14. Such two or more devices may be of the same type, that is, all of the type shown in Fig. 1, they may be all of the type shown in Fig. 2, or some of such devices may be that of Fig. 1 and others may be that of Fig. 2. Additionally, the various parts of the circuit may be rearranged with respect to each other without appreciably affecting the operation of the circuit. Various other changes may also be made, such as in the electrical values suggested herein, by way of example, without departing from the spirit and scope of the invention, as the latter will now be understood by those skilled in the art.

What is claimed is:

1. Electrical apparatus comprising a source of electrical energy including a storage condenser, a load circuit connected to be fed by the storage condenser, said load circuit having a substantial impedance, a control gap interposed between the storage condenser and the load circuit, and a second condenser having one side connected between the control gap and the load circuit and adapted to be charged by the source of electrical energy, the other side of the second condenser being so connected as to be at the same potential as one side of the storage condenser, the second condenser being so connected as to increase the initial peak flow of current through the control gap.

2. Electrical apparatus as defined in claim 1, wherein the second condenser has a capacity which is relatively small compared to that of the storage condenser.

3. Electrical apparatus as defined in claim 2 wherein the load circuit includes a step-up transformer.

4. Electrical apparatus as defined in claim 3, wherein the load circuit includes an igniter discharge gap connected to the step-up transformer.

5. Electrical apparatus comprising a source of electrical energy including a storage condenser, a load circuit connected to be fed by the storage condenser, a control gap interposed between the storage condenser and the load device, and a second condenser connected in direct shunt with the control gap and adapted to be charged by the source of electrical energy.

6. Electrical apparatus as defined in claim 5 wherein the load circuit has substantial impedance.

7. Electrical apparatus as defined in claim 6, wherein the second condenser has a capacity which is relatively small compared to that of the storage condenser.

8. Electrical apparatus as defined in claim 7 wherein the load circuit includes a step-up transformer.

9. Electrical apparatus as defined in claim 8 comprising an igniter spark gap connected to be energized by the transformer.

10. Electrical apparatus comprising a source of electrical energy including a storage condenser, a load circuit connected to be fed by the storage condenser, a control gap interposed between the storage condenser and the load device, a first side of the storage condenser being connected to the input electrode of the control gap and a second condenser having one side connected to the output electrode of the control gap, the second side of the second condenser being so connected as to have the same potential as the second side of the storage condenser.

11. Electrical apparatus as defined in claim 10, wherein the second condenser has a capacity which is relatively small compared to that of the storage condenser.

12. Electrical apparatus as defined in claim 11 wherein the load circuit has substantial impedance.

13. Electrical apparatus as defined in claim 12 wherein the load circuit includes a step-up transformer.

14. Electrical apparatus as defined in claim 13 comprising an igniter spark gap connected to be energized by the transformer.

References Cited in the file of this patent

UNITED STATES PATENTS

| | | |
|---|---|---|
| 1,745,830 | Bethenod | Feb. 4, 1930 |
| 2,433,462 | Laird | Dec. 30, 1947 |
| 2,643,284 | Putnam | June 23, 1953 |
| 2,697,184 | Lautenberger | Dec. 14, 1954 |
| 2,717,337 | Laird | Sept. 6, 1955 |
| 2,789,632 | Smits | Apr. 23, 1957 |